March 21, 1933.  A. OBERHOFFKEN  1,902,179
MACHINE TOOL
Filed May 15, 1931  9 Sheets-Sheet 1

Inventor
A. Oberhoffken
BY William H. Knight
Attorney

March 21, 1933. A. OBERHOFFKEN 1,902,179
MACHINE TOOL
Filed May 15, 1931 9 Sheets-Sheet 6

Inventor
A. Oberhoffken
By
Attorney

March 21, 1933.  A. OBERHOFFKEN  1,902,179
MACHINE TOOL
Filed May 15, 1931   9 Sheets-Sheet 7

Inventor
A. Oberhoffken
BY
Attorney

Patented Mar. 21, 1933

1,902,179

UNITED STATES PATENT OFFICE

ALEXANDER OBERHOFFKEN, OF ROCKFORD, ILLINOIS, ASSIGNOR TO THE INGERSOLL MILLING MACHINE COMPANY, OF ROCKFORD, ILLINOIS, A CORPORATION OF ILLINOIS

MACHINE TOOL      REISSUED

Application filed May 15, 1931. Serial No. 537,569.

In those industries employing mass production methods for machining metal parts, the machine tools required for such operations as milling, boring, drilling, and tapping are, in most instances, built on special order at considerable expense.

Frequently changes are made in the design of the work to be machined which requires a change-over in the design of the machine tool to adapt it to the new design of the work. These change-overs are costly as the machine tool must be rebuilt to an extent depending upon the changes made in the design of the work and the adaptability of the machine for the change.

The present invention has for one of its important objects the provision of a standardized saddle unit with accommodations for detachably mounting anyone of several different interchangeable tool units thereto. The tool unit being equipped for some one particular machining operation and being either standardized for this particular operation or at least so constructed that it may be economically changed over to meet the requirements of changes in the design of the work.

Another feature of the invention is the provision of a self-contained saddle unit assembly with accommodations for detachably mounting anyone of several different interchangeable tool units and having built into the saddle, a motorized feed and drive mechanism, electrical equipment and feed rate mechanism.

Still another feature of the invention is the provision of a saddle unit in which anyone or more of the foregong mechanisms may be built into the saddle unit with other of the mechanisms provided for apart from unit. As an example instead of producing a wholly self-contained saddle unit with means for accommodating a tool unit, only the drive need be included as a built-in feature with the remaining operating and control mechanisms positioned at a remote station.

With such an organization, one standardized saddle unit will accommodate either a milling tool unit, a drilling unit, a boring unit, or a tapping unit.

To more clearly outline the advantages of the invention, it will be considered that an automobile plant has a production line-up for machining cylinder blocks. Such a line-up would include one of these standardized saddles for each of the operations employed. One saddle would be equipped with a milling unit, another with a drilling unit, another with a boring unit, and another with a tapping unit. Each saddle with its interchangeable tool unit therefore becomes a machine tool which for the most part is standardized in construction excepting perhaps the less expensive tool unit part thereof.

On this basis not only is the cost of the machine to the customer less compared to a machine built on special order, but when the change-overs are required, only the tool unit part of the machine need be converted while the saddle unit will remain the same.

Further objects and advantages will appear hereinafter as the description proceeds with reference to the accompanying drawings.

In said drawings:

Figure 10 is a view similar to Figure 9, but showing the position the parts will assume when the clutch is in;

Figure 11 is a view partly in section of the control drum;

Figure 12 is a view in section taken on the line 12—12, Figure 11;

Referring now to the drawings in detail, 5 represents the saddle unit and 6 one of the interchangeable tool units. For the present showing, excepting in Figures 2 and 3, a two-spindle milling unit has been selected to illustrate the application of the invention. The tool unit is mounted upon the saddle unit in a cradle-like right angle frame defined by the lines a—b. Bolts being preferably used to rigidly hold the tool unit on the saddle.

This head assembly may be mounted for translation on either vertical or horizontal ways as required. In the present showing, horizontal ways 7 are shown. The ways 8 on the saddle unit which slide upon the ways 7 extend the length of the saddle to provide as long a bearing surface as possible and in this connection, it should be noted that the ways on the saddle unit extend under the tool unit for the length thereof.

The feed or translation of the head assembly is preferably realized by a pinion 9 carried by the saddle in constant mesh with a rack 10. The rack 10 is preferably fixed relatively to the supporting frame and extends parallel with the support ways 7.

The drive for the tool spindle or spindles, as the case may be, is effected by a gear 11 carried by the saddle to mesh with a gear in the spindle drive in the tool unit.

Figure 14:
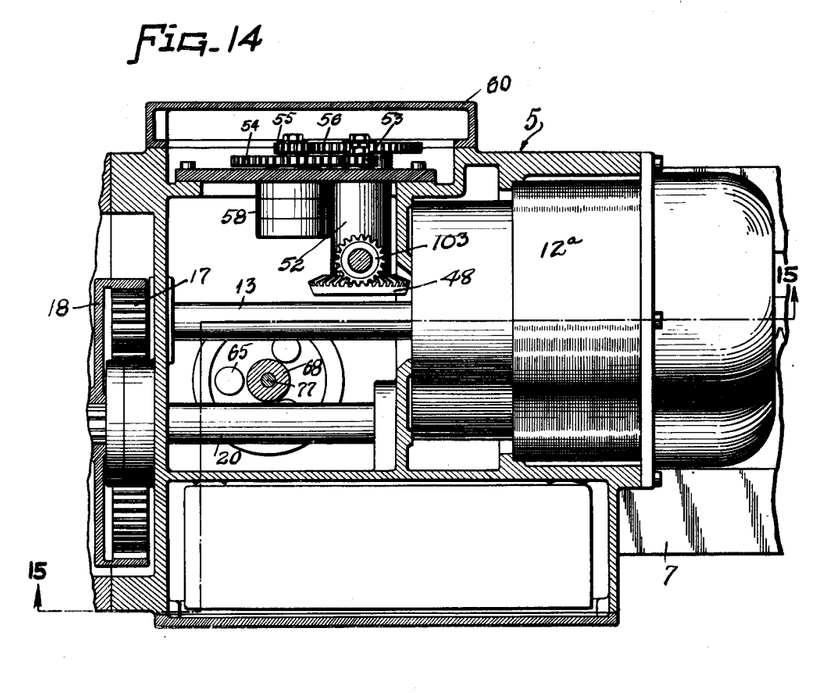
Figure 14 is a view in horizontal section of a modified type of saddle unit.
Figure 15:
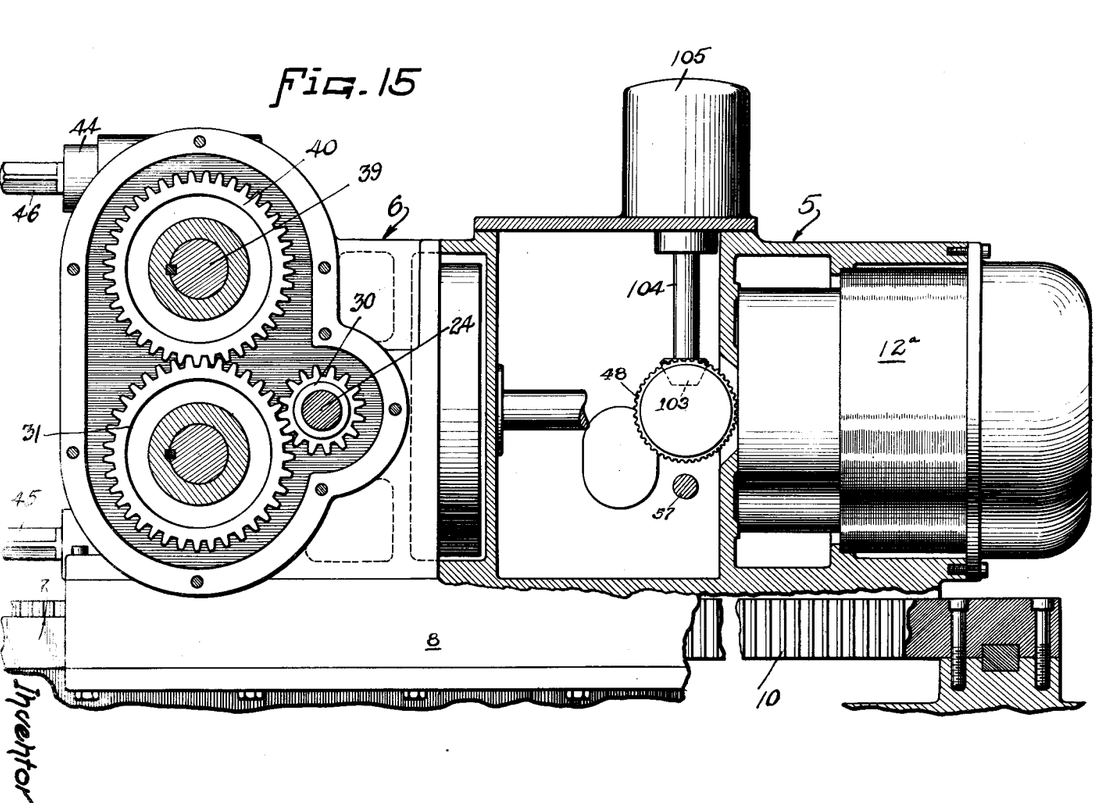
Figure 15 is a view in section taken on the line 15—15, Figure 14.
Figure 16:
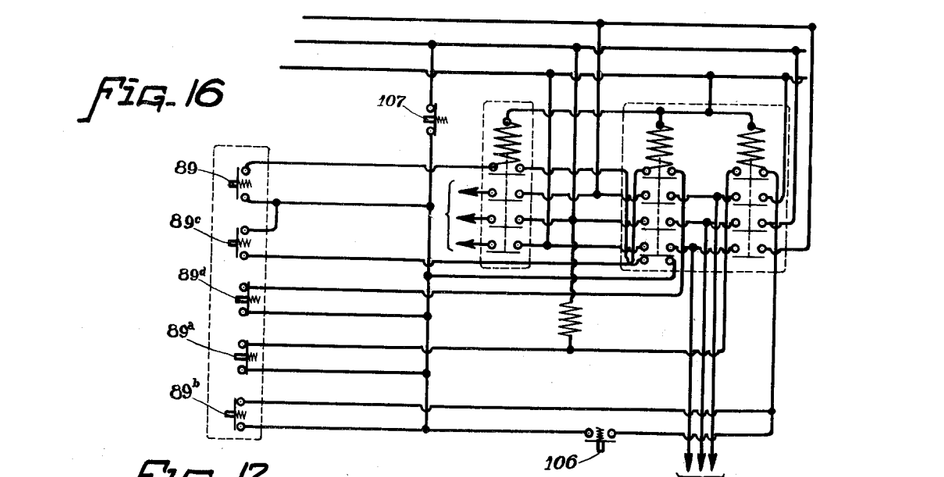
Figures 16 and 17 are electric circuits for the two forms of saddle units.

Before going further with the details of the assembly, attention will be called to the two self-contained forms illustrated. In both of these forms, the operating and control mechanism is built in. In Figures 1 to 13 inclusive, one embodiment of the invention is shown and another embodiment is shown in Figures 14 and 15. In Figure 16 a circuit is shown for the form in Figures 1 to 13 and in Figure 17 a circuit is shown for the form in Figures 14 and 15. The same tool units may be used with either form of saddle unit.

The form illustrated in Figures 1 to 13 will be first described in detail. 12 represents a combined drive and feed motor. The drive mechanism comprises a shaft 13 having a bearing support 14 adjacent the motor and a second bearing support 15 in the end wall 16 of the saddle housing. Carried on the end of the shaft 13 in advance of the bearing 15 is a spur gear 17 which is in constant mesh with an internal ring gear 18. The gear 18 is splined on the end 19 of a countershaft 20. The reduced opposite end 21 of the shaft 20 is mounted with freedom of rotation in the anti-friction bearing 22. Also splined on the end 19 of the shaft 20 is the bevel gear 11, heretofore generally mentioned. The gear 11 meshes with a companion bevel gear 23 keyed or otherwise fixed on the end of a short countershaft 24. The shaft 24 is mounted at one end in an anti-friction bearing 25, accessible by removing the cover 26 and adjacent its opposite end in a similar bearing 27. The bearing 25 is set in the removable plate 28 and the bearing 27 is set in the web 29 of the tool unit housing 6.

Mounted on the shaft 24 is a spur gear 30 which meshes with a larger spur gear 31 splined on one of the tool spindles 32. The gear 31 is set in anti-friction bearings 33. Threaded into a sub-plate 34 is a cap 35 for the end of the spindle. The tool spindle extends through the quill 36 and is fixed in driving relation with the tool adapter.

The quill is slidably mounted in the sleeve 37 formed as an integral part of the tool unit housing 6. When the tool unit is built for two-spindles as in the present showing, a duplicate quill 38 and a duplicate spindle 39 is provided. Splined on the spindle 39 is a gear 40, see Figure 15, which meshes with the gear 31. The second tool spindle 39 is thus driven off the gear 31. The cap 35 is made to also enclose the end of the spindle 39.

The quills 36 and 38 are equipped to be individually fed in and out by the pinions 41 and 42 which mesh with the rack faces on the quills. These pinions are fixed on shafts which are mounted in cylinder housings 43 and 44 and the exposed ends 45 and 46 of the shafts are squared for the reception of hand cranks.

Figure 1:
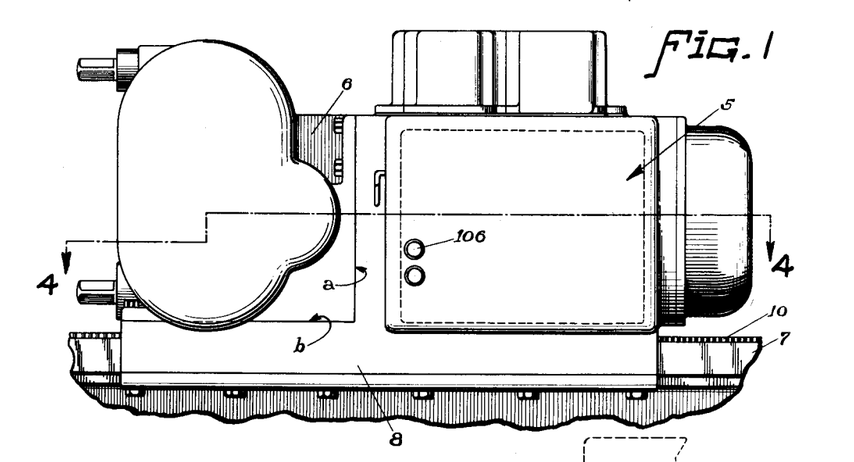
Figure 1 is a view in side elevation of one form of saddle unit showing the same equipped with a two-spindle milling unit.
Figure 2:
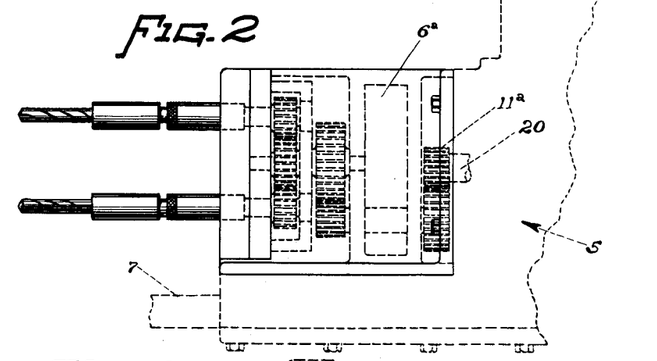
Figure 2 is a fragmentary view illustrating the application of a drilling unit to the same saddle assembly.

The foregoing explains the assembly of the combined tool unit and saddle when a two-spindle milling unit is employed. Now to convert the unit into a drill as indicated in Figure 2, the milling tool unit 6 is removed and the drilling unit 6ª is substituted. Here the countershaft 20 is equipped with a spur gear 11ª in lieu of the bevel gear 11. The gear 11ª is made to mesh with a driven gear in the tool spindle drive. This gear drive for the tools may be arranged in any manner suitable for the purpose and the present showing is made to show the universal use of the saddle unit.

Figure 3:
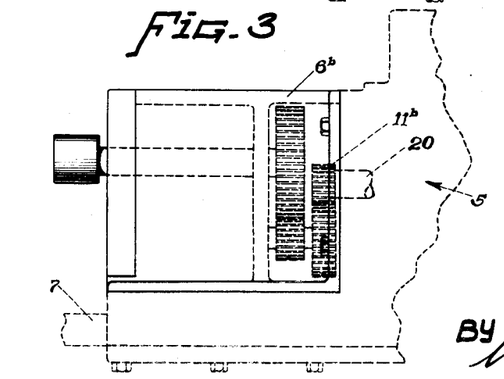
Figure 3 is a view similar to Figure 2 showing the application of another tool unit with the same saddle.
Figure 4:
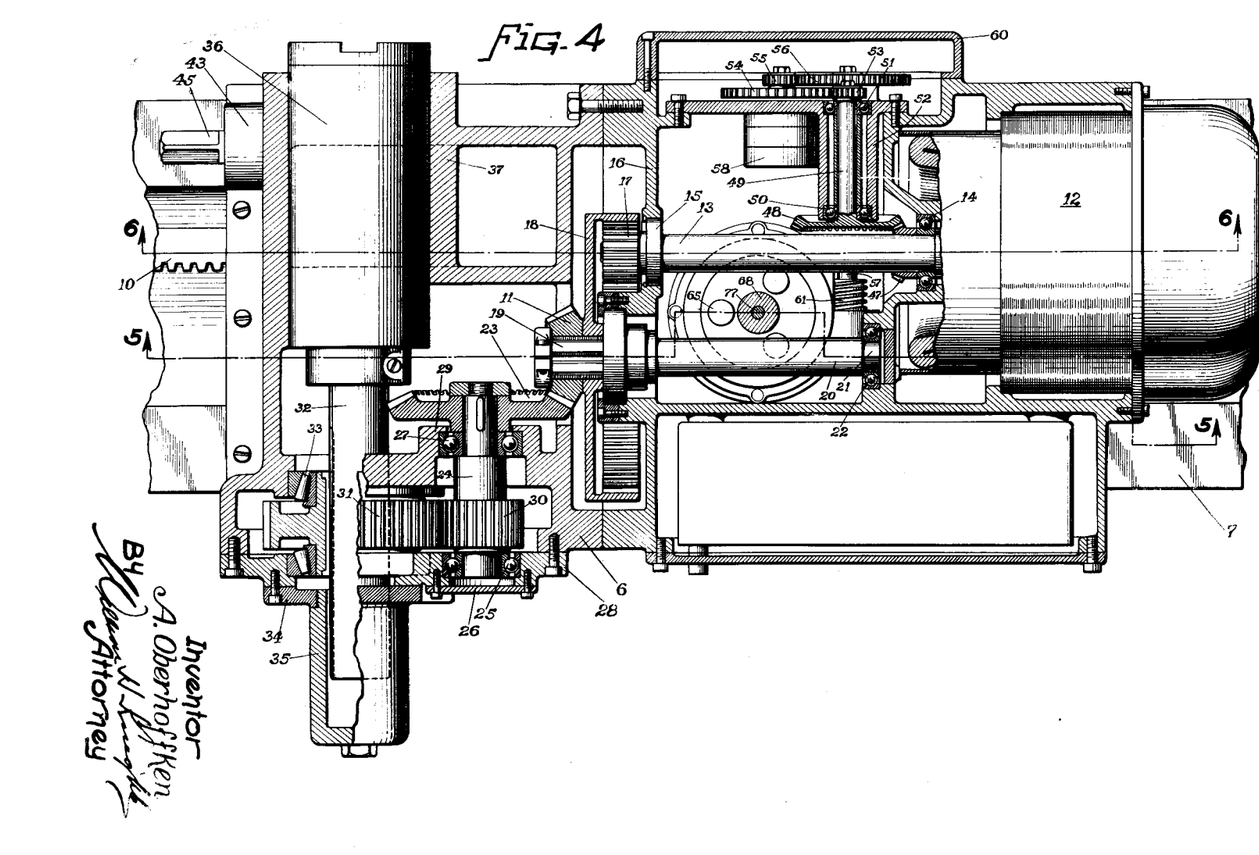
Figure 4 is a horizontal section taken on the line 4—4, Figure 1.
Figure 5:
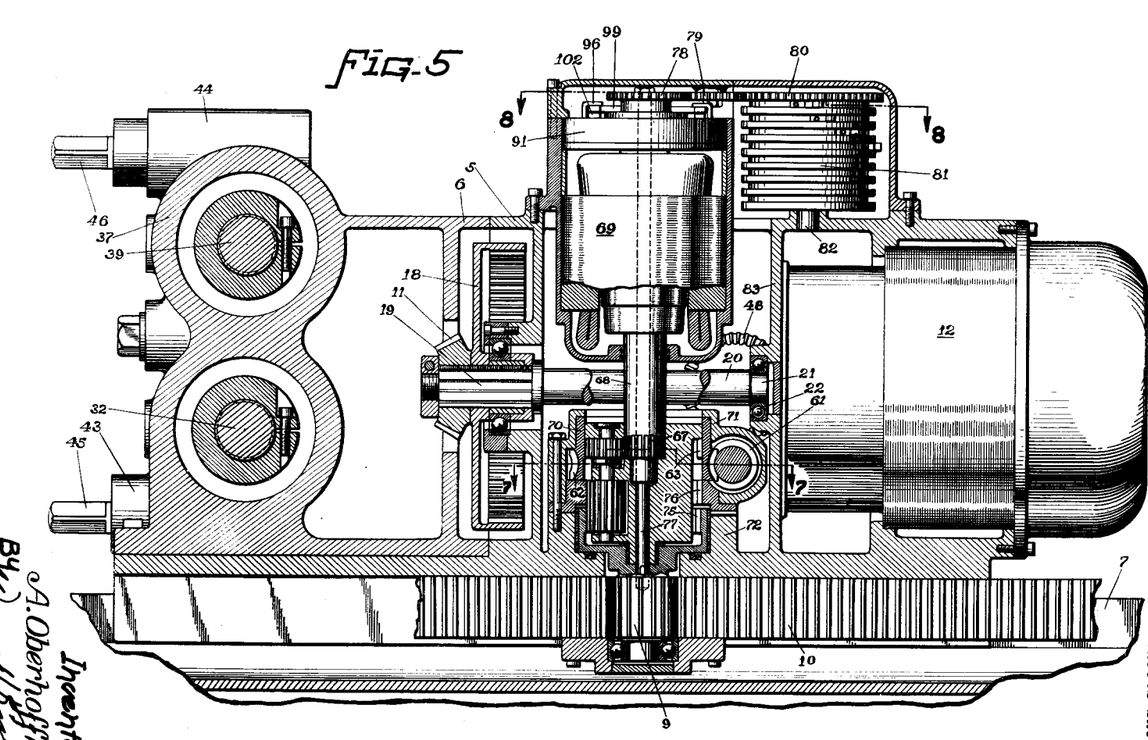
Figure 5 is a view in section taken on the line 5—5, Figure 4.
Figure 6:
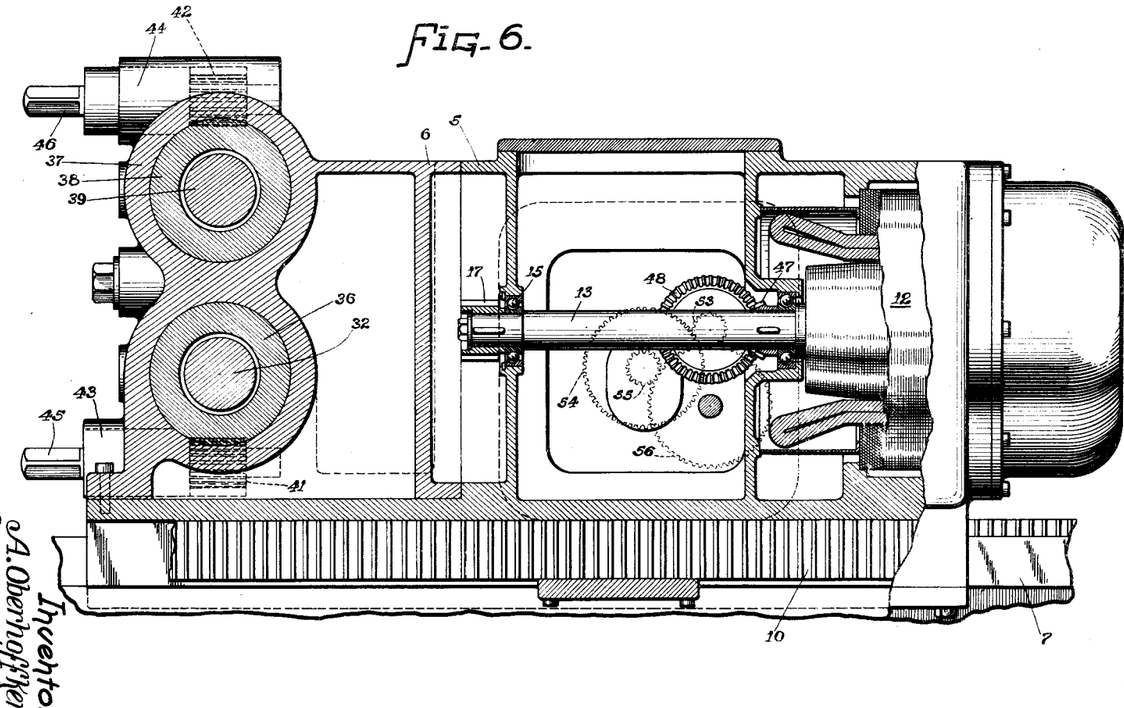
Figure 6 is a view in section taken on the line 6—6, Figure 4.

Another type of tool unit is shown in Figure 3; here again a different tool unit 6ᵇ is substituted. The drive in this instance being taken off the spur gear 11ᵇ on the end of the countershaft 20.

The only requirements for the tool units to adapt any number of different types to the standard saddle unit is the size of the casings which must always be made to fit the cradle frame on the saddle; otherwise the tool units may be designed in any manner suitable for any particular purpose.

The feed for the head assembly is realized by the motor 12. The motor is thus used for both drive and feed. The feed mechanism comprises a bevel driving gear 47 mounted coaxially with the shaft 13 in advance of the anti-friction bearing 14. This bevel gear meshes with a large bevel gear 48 on the end of a jack-shaft 49. The shaft 49 is supported in anti-friction bearings 50 and 51 which are in turn mounted at opposite ends of a sleeve housing 52.

On the far end of the shaft 49 is a pinion 53 in mesh with a gear 54. The gear 54 is mounted on a stud shaft in fixed relation to the gear 55 which meshes with a relatively large gear 56 on the end of the worm shaft 57. An oil pump 58 is driven by this feed gearing and serves to lubricate the bearings and gearing in the saddle through piping (not shown).

The feed gearing is supported within the housing by a plate 59 which is formed as an integral part of the sleeved housing 52. The gearing is accessible from the outside of the housing by removal of a cover 60.

Figure 7:
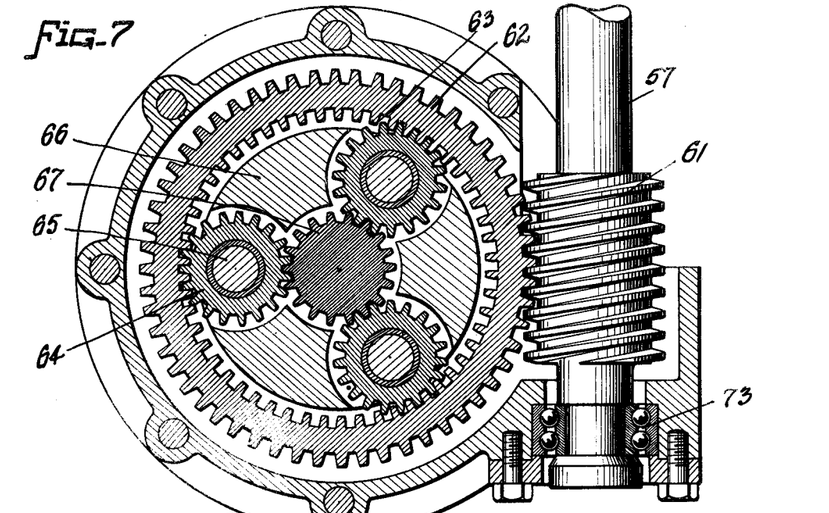
Figure 7 is a view in section taken on the line 7—7, Figure 5.
Figure 8:
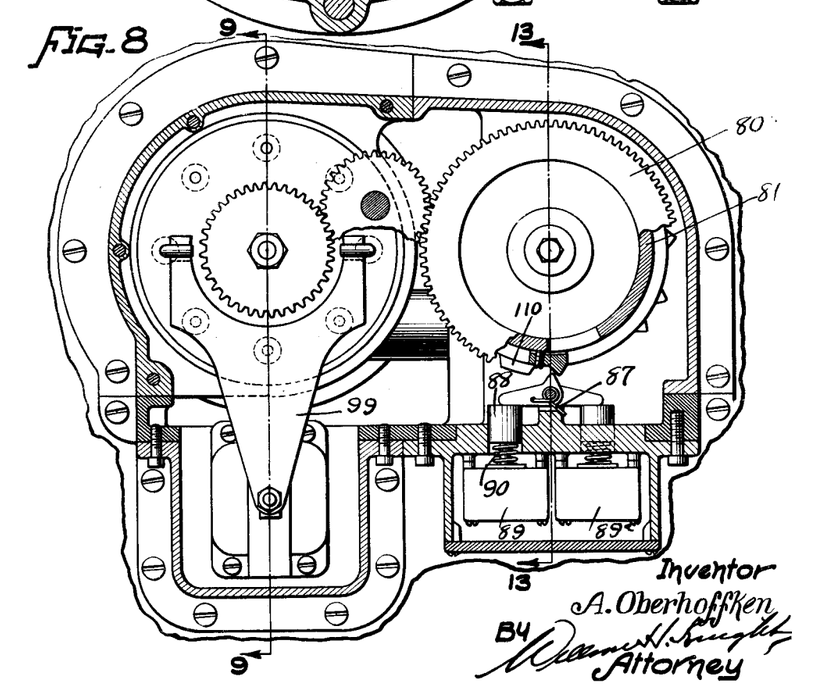
Figure 8 is a view in section taken on the line 8—8, Figure 5.
Figure 9:
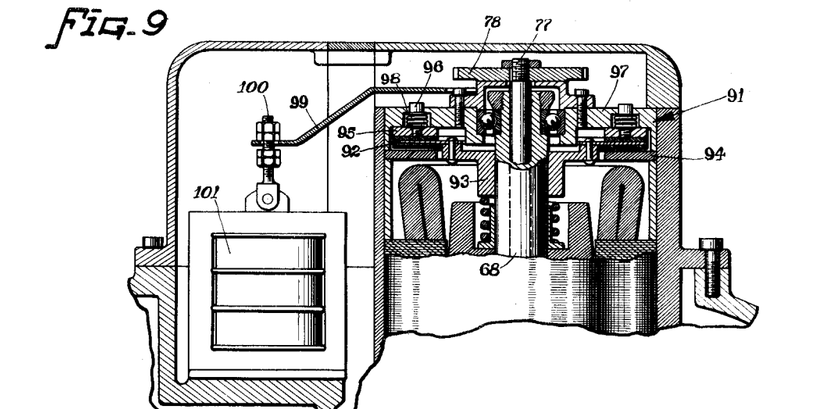
Figure 9 is a view in section taken on the line 9—9, Figure 8.
Figures 10, 11, 12:
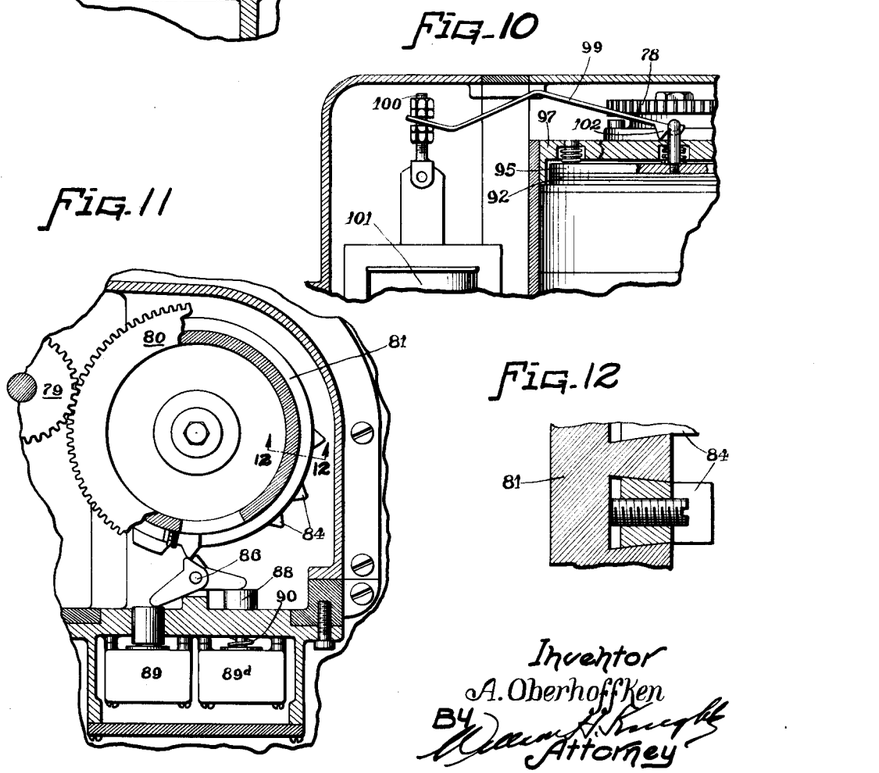
Figure 13:
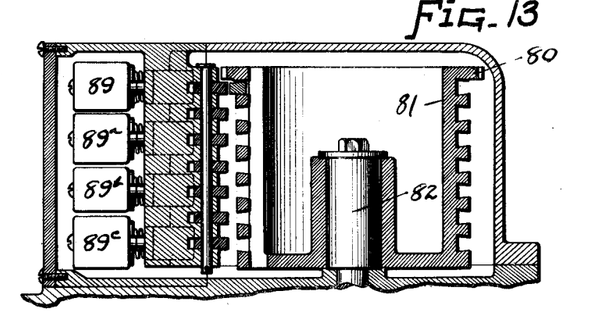
Figure 13 is a view in section taken on the line 13—13, Figure 8.

The worm 61 on the shaft 57 meshes with the worm gear 62 which serves as an orbit gear in a planetary system. In this connection the worm gear is made with offset internal teeth 63 with which one set of planets 64 mesh. The planets 64 are mounted free on planet shafts 65, the ends of which being fixed in the floating spider 66. The planets are also in mesh with the sun gear 67 which is generated on the end of the largest diameter of the shaft 68 of the rapid traverse motor 69. The spider is floated within an apron 70 on the orbit gear 62 which in turn is journaled in the casing 71. This casing is made with an enclosure for the worm 61 and is bolted to the boss 72. As shown in Figure 7, the end of the worm shaft 57 is supported in an anti-friction bearing 73 which in turn is supported in the end of the enclosure for the worm. Also mounted with freedom of rotation on the planet shafts is a second set of planets 74, each of which mesh with a floating orbit gear 75 and a fixed orbit 76. The floating orbit 75 carries the pinion 9. The rapid traverse motor shaft 68 is piloted in the spider 66 and the spider is piloted in the floating orbit 75.

The differential planet system above described corresponds in principle to the "feed and rapid traverse mechanism for machine tools" described and claimed in the application of the same inventor, Serial No. 506,165, filed January 2, 1931. In this prior case, a single reduction is illustrated whereas in the present case, a double reduction is shown.

Extending through the rapid traverse motor shaft 68 is a smaller control shaft 77. One end of this shaft is keyed to the pinion 9 and its opposite end carries a gear 78 which meshes with an idler gear 79 which in turn meshes with a larger gear 80 on the end of a control drum 81. The shaft 82 for this drum is mounted in the web 83 so that the drum is free to revolve on its shaft when driven by the gear 80.

The drum 81 is fashioned with a plurality of continuous annular grooves in which the switch tripping dogs 84 are fixed at predetermined spaced and staggered intervals. When the drum is revolved, these dogs wipe across selected ones of a plurality of aligned switch actuating trips 85. These trips are individually pivoted on a pintle 86 and each is equipped with a spring 87 which holds it in contact with the button 88 on each of a group of switches 89, 89$^a$, 89$^b$, 89$^c$, and 89$^d$.

When the dogs actuate the trips and press the buttons down to momentarily close or open the switches depending upon the hookup, the springs 90 for each button will return the buttons when the dogs have moved past the trips.

When the head assembly is being fed, the rapid traverse motor 69 is cut out, and to hold the sun gear 67 against turning at this time, a solenoid or mechanically controlled friction brake 91 is employed. A solenoid has been selected to illustrate this control, but a mechanical arrangement may be used.

The brake mechanism comprises a friction disc 92 having a hub 93 keyed on the motor shaft 68 to turn therewith, but free to slide thereon. Disposed under this disc 92 is a fixed abutment plate 94. On the opposite side of the disc 92 is a non-rotatable floating pressure plate 95. Spaced around the pressure plate 95 are a plurality of studs 96, the same being threaded into the plate with their opposite ends protruding through openings made to receive them in the fixed top plate 97. The studs are backed up by springs 98 which are seated in enlargements of the openings through which the studs protrude.

The protruding ends of two opposed ones of these studs are turned to serve as hooked ends for holding the ends of the actuating yoke 99. The opposite end of this yoke is connected with the threaded stem 100 of the solenoid 101. On each of the legs of the yoke 99 is a lug 102 which bears against the top plate 97. These lugs serve as fulcrums so that when the solenoid is energized and the stem 100 is pulled down, the yoke will be rocked about the fulcrum points 102 pulling up the plate 92 against the pressure of the springs 98 and thus releasing the clutch. When the solenoid is not energized, the springs 98 will impart the required thrust to the plate 95 and hold the clutch thus holding the sun gear against rotation as it must be to feed the head.

Where it is desired to return the head with a rapid traverse, a combined feed and drive motor can be used, but where the head is to be fed on return, a separate feed motor will be required.

The separate feed motor arrangement is contemplated in Figures 14 and 15. In this modification the drive motor 12ª runs continuously in one direction. The rapid traverse motor and mechanism operating in connection therewith is identical with that of the first described form, excepting the feed take out gear 47 is eliminated, the gear 48 is turned around and meshes with a pinion 103 on the end of the shaft 104 of the feed motor 105.

*Operation*

Considering first the form shown in Figures 1 to 13 inclusive and the circuit shown in Figure 16. With the head in its terminal starting position, the operator, to initiate an operating cycle, will press the switch button 106 (see Figures 1 and 4). This will close the circuit to the rapid traverse motor 69 and since the solenoid 101 is on the same circuit, it will be energized releasing the clutch 91. The head will thus be moved forward at a rapid approach. At this particular stage in the cycle, the drive and feed motor is not operating although it might be without disturbing the rapid traverse. The drive and feed motor may be started at any stage in the rapid traverse and this is determined by the arrangement of the control dogs on the drum 81. As the head moves forward, the drum revolves and brings one of the dogs into position to trip the switch 89, and the drive and feed motor will be started.

With the worm shaft 57 either stationary or else rotating very slowly as it will when the feed and drive motor has started and with the sun gear 67 rotating at a relatively rapid rate, the orbit gear serves as a fulcrum for the planets 64 causing them to drive the spider at a corresponding fast rate. Since the second set of planets 74 are on the same shafts as the first named set, they move about the axis of the spider at the same rate as the planets 64. The planets 74 mesh with the fixed ring gear 76 and are thus rotated on their own axis.

They also mesh with the floating orbit gear 75 and the ratio between the teeth on the fixed ring gear 76 and the floating orbit gear 75 causes the floating orbit gear to rotate relatively to the fixed ring gear.

The head assembly is now rapidly traversing with the feed and drive motor running. As the drum 81 revolves further, it will trip the switch 89ª cutting out the rapid traverse motor 69 deenergizing the solenoid 101 releasing the friction brake to the influence of the springs 98; whereupon the brake will be applied and the sun gear held against rotation. as the feed and drive motor 12 continues to run, the planets will fulcrum on the sun gear 67, and thus drive the spider at a relatively slower rate which will develop the required feed rate for the head assembly.

By locating a plurality of dogs 84 in spaced relation in the same groove on the control drum, the forward half of the cycle can be changed from rapid traverse to feed, from feed to rapid traverse, and back to feed as many times as desired.

After the rapid traverse of the cycle has been initiated by the operator pressing the button 106 and the translation of the head has been changed to feed by one of the dogs on the control drum, the feed can be changed over to rapid traverse again by locating a dog to operate the switch 89ᵇ.

Reverse is effected when two of the dogs trip the switches 89ᶜ and 89ᵉ. This cuts in the rapid traverse motor 69 and also reverses its direction. When the head assembly reaches its terminal starting position, one of the dogs trips the switch 89ᵈ and cuts out the rapid traverse motor to bring the head to rest.

The safety switch 107 serves to cut out the line at any stage in the cycle in case of an emergency.

Figure 17:
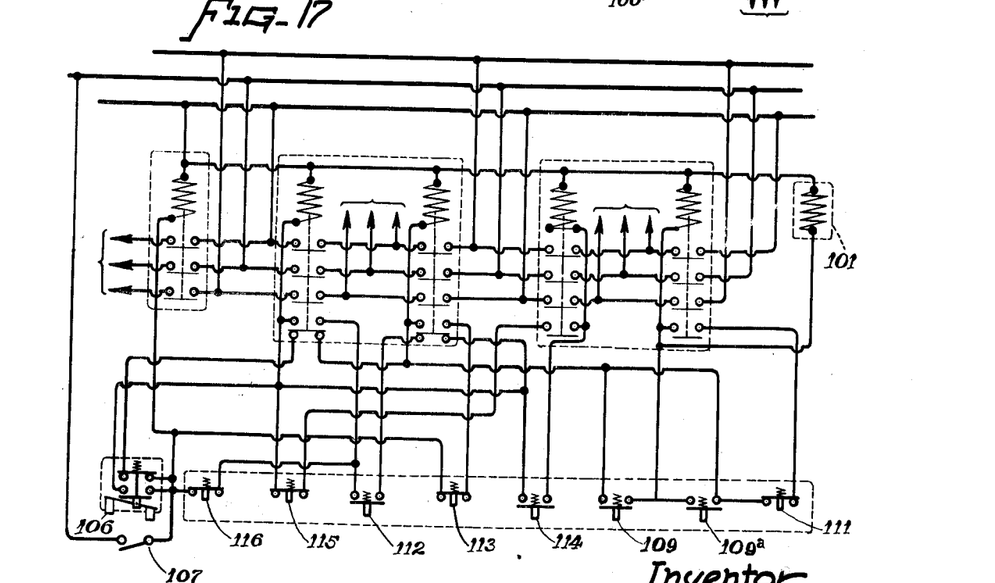

The above described operation covers a form where the head assembly is fed in one direction only. Where it is desired to change over from rapid traverse to feed, or vice versa, on return the form shown in Figures 14 and 15 and circuit shown in Figure 17 is employed.

In this form a separate feed motor 105 is used as previously stated.

The operator initiates this cycle by closing the switch 108. This starts the drive motor 12ª, the feed motor 105 and the rapid traverse motor. Switch 109 is held closed by a cam 110 (see Figure 8). The head now starts up in rapid traverse. By locating a dog on the control drum to open the switch 111, the rapid traverse is changed over to feed. By locating the dogs to alternately close and open the switches 109ª and 111, the feed rate can be changed as often as desired.

At the terminal end of the cycle, the head will be reversed when one of the dogs closes the switch 112 and opens the switch 113. This reverses the feed motor 105. The feed is changed over to rapid traverse on return when one of the dogs closes the switch 114. To go back into rapid traverse, one of the dogs opens the switch 115. The head is brought to rest when the operator opens the switch 107; otherwise the cycle of the head will be automatically repeated as the switch 114 is being held down by the cam 110 at the time the head reaches its terminal starting position.

From the above, it will be seen that a saddle unit with anyone of a number of different tool units and with the operating and control mechanism built in provides a completely self-contained head. Where desirable, anyone or a combination of two or more of the operating and control mechanisms may be built in; the parts of those mechanisms not built in otherwise provided for to suit any particular purpose.

Having thus described and shown an embodiment of this invention, what I claim and desire to secure by Letters Patent of the United States is:

1. In a machine tool, the combination of a frame structure, a self-contained machine tool head assembly mounted to move bodily on said frame structure and comprising a saddle unit, tool driving and saddle feeding mechanism and motors therefor carried by said saddle unit, an interchangeable tool unit carried by said saddle unit, tool driving mechanism in said tool unit and means for connecting the tool driving mechanisms of said units for extending the tool drive from the saddle unit into the tool unit.

2. In a machine tool, the combination of a frame structure, a self-contained machine tool head assembly mounted to move bodily on said frame structure and comprising a saddle unit, tool driving and saddle feeding mechanism and motors therefor carried by said saddle unit, an interchangeable tool unit carried by said saddle unit, tool driving mechanism in said tool unit and gearing connecting the terminal ends of the tool driving mechanisms of said units to extend the tool drive from the saddle unit to the tool unit.

3. In a machine tool, the combination of a frame structure, a self-contained machine tool head assembly mounted to move bodily on said frame structure and comprising a saddle unit, tool driving and saddle feeding mechanism and motors therefor carried by said saddle unit, an interchangeable tool unit carried by said saddle unit, tool driving mechanism in said tool unit and means for connecting the terminal ends of the tool driving mechanisms of said units to extend the tool drive from the saddle unit to the tool unit.

4. In a machine tool, the combination of a frame structure, a sef-contained machine tool head assembly mounted to move bodily on said frame structure and comprising a saddle unit, tool driving and saddle feeding mechanism and motors therefor carried by said saddle unit, feed control mechanism also carried by said saddle unit, an interchangeable tool unit carried by said saddle unit, tool driving mechanism in said tool unit and means for connecting the tool driving mechanisms of said units for extending the tool drive from the saddle unit to the tool unit.

5. In a machine tool, the combination of a frame structure, a self-contained machine tool unit head mounted to move bodily on said frame structure, motorized tool driving and head feeding mechanism carried by said head, and a feed rate control mechanism also carried by said head for changing the rate of movement of the head on the frame from rapid traverse into feed and from feed into rapid traverse and for also reversing the direction of the movement of the head on the frame.

6. In a machine tool, the combination of a frame structure, a self-contained machine tool head assembly mounted to move bodily on said frame structure and comprising a saddle unit, a motorized tool driving mechanism in said saddle unit, motorized differential head feeding mechanism in said saddle unit, an interchangeable tool unit carried by said saddle unit, tool driving mechanism in said tool unit and means for connecting the tool driving mechanisms of said units for extending the tool drive from the saddle unit into the tool unit.

7. In a machine tool, the combination of a frame structure, a self-contained machine tool head assembly mounted to move bodily on said frame structure and comprising a saddle unit, a motorized tool driving mechanism in said saddle unit, motorized differential head feeding mechanism in said saddle unit, feed rate control mechanism in said saddle unit, an interchangeable tool unit carried by said saddle unit, tool driving mechanism in said tool unit and means for connecting the tool driving mechanisms of said units for extending the tool drive from the saddle unit into the tool unit.

8. In a machine tool, the combination of a frame structure, a self-contained machine tool head assembly mounted to move on said frame structure and comprising a saddle unit, motorized drive mechanism in said saddle unit, motorized differential feed mechanism in said saddle unit, feed rate control mechanism in said saddle unit, an interchangeable tool unit carried by said saddle unit, drive mechanism in said tool unit and means for connecting the driving mechanisms of said units for extending the drive from the saddle unit into the tool unit, comprising gearing carried by the respective terminal ends of said drive mechanisms.

9. In a machine tool, the combination of a frame structure, a self-contained machine tool head assembly mounted to move on said frame structure and comprising a saddle unit, a motorized drive in said saddle unit, motorized feed mechanism in said saddle unit, motorized rapid traverse mechanism in said saddle unit, feed rate control mechanism in said saddle unit operable by the movement of the head assembly for changing the movement of the head over from the rapid traverse to feed and from feed to rapid traverse and to also reverse the direction of the movement of the head assembly, an interchangeable tool unit carried by said saddle unit, drive mechanism in said tool unit and means for connecting the drive mechanisms for extending the drive from the saddle unit into the tool unit.

10. A self-contained unit head of the class described, comprising tool driving mechanism in the head, a motor carried by the head for driving said mechanism, motorized feed mechanism in the head for bodily moving the head, and means carried by the head for controlling the operating rate of the feed mechanism, comprising a group of motor controlling switches and means set in motion by the operation of the feed mechanism for opening and closing predetermined ones of said switches.

11. The combination with a machine tool frame having slideways and a self-contained unit movable along said slideways, of a driving motor, a feeding motor, a rapid traverse motor, and a tool spindle, all carried by said unit, means operated by the driving motor for driving said tool spindle, means operated by the feeding motor for feeding the unit bodily along said slideways and means operated by the rapid traverse motor for changing the rate of said feed.

12. The combination of a machine tool frame having slideways and a self-contained unit movable along said slideways, of a combined driving and feeding motor, a rapid traverse motor and a tool spindle, all carried by said unit, means operated by said combined driving and feeding motor for driving said tool spindle and bodily feeding said unit along said slideways and means operated by said rapid traverse motor for changing the rate of said feed.

13. In a machine tool, the combination of a frame having slideways, a self-contained tool head assembly mounted for movement along said slideways, said tool head assembly comprising a saddle and an interchangeable tool unit, a combined driving and feeding motor carried by said saddle, a tool spindle carried by said tool unit, means operated by said combined driving and feeding motor for driving said tool spindle and bodily feeding said head assembly along said slideways and means operated by said rapid traverse motor for changing the rate of said feed.

14. In a machine tool, the combination of a frame structure, a self-contained machine tool head assembly mounted to move on said frame structure and comprising a saddle unit and an interchangeable tool unit, drive, feed, and rapid traverse mechanisms and motors therefor carried by said head assembly, feed rate control mechanism and the electrical equipment also carried by said head assembly.

15. In a machine tool, the combination of a frame structure, a self-contained machine tool head assembly mounted to move on said frame structure and comprising a saddle unit and an interchangeable tool unit, drive, feed, and rapid traverse mechanisms and motors therefor carried by said head assembly, feed rate control mechanism and the electrical equipment also carried by said head assembly, said feed rate control mechanism comprising a revolving drum, a drive between the feed mechanism and said drum to revolve the same and switch operating means on the drum positioned to open and close predetermined ones of a group of switches in circuit with said motors.

16. A self-contained unit head assembly for machine tools, comprising a saddle unit, a cradle on said saddle, slideways on said saddle extending under said cradle and an interchangeable tool unit adapted to occupy said cradle.

17. A self-contained unit head assembly for machine tools, comprising a saddle unit, motorized drive and feed mechanism carried by said saddle, a cradle on said saddle, slideways on said saddle extending under said cradle, an interchangeable tool unit adapted to occupy said cradle, a spindle drive in said tool unit, and means for connecting said spindle drive with the motorized drive in the saddle.

18. A self-contained unit head assembly for machine tools, comprising a saddle unit, motorized drive and feed mechanism carried by said saddle, feed control mechanism carried by said saddle, a cradle on said saddle, slideways on said saddle extending under said cradle, an interchangeable tool unit adapted to occupy said cradle, a spindle drive in said tool unit, and means for connecting said spindle drive with the motorized drive in the saddle.

19. A self-contained unit head assembly for machine tools, comprising a saddle unit, motorized drive and feed mechanism carried by said saddle, feed control mechanism carried by said saddle, a cradle on said saddle, slideways on said saddle extending under said cradle, an interchangeable tool unit adapted to occupy said cradle, a spindle drive in said tool unit, and means for connecting said spindle drive with the motorized drive in the saddle unit, comprising a driven gear in said spindle drive adapted to mesh with a drive gear in the motorized drive of the saddle when the tool unit occupies said cradle.

20. In a machine tool, the combination of a frame structure, a machine tool head assembly mounted to move on said frame structure, and comprising a saddle unit, drive mechanism carried by said saddle unit, an interchangeable tool unit carried by said saddle unit, drive mechanism in said tool unit, means for connecting the drive mechanisms of said units for extending the drive from the saddle unit into the tool unit, and motorized mechanism carried wholly by the head for bodily moving the head on said structure.

21. In a machine tool, the combination of a frame structure, a machine tool head assembly mounted to move on said frame structure, and comprising a saddle unit, an interchangeable tool unit carried by said saddle unit, means for driving the tool of said tool unit, means for bodily feeding said tool head assembly on said frame structure, and means carried wholly by the head assembly for changing the rate of said feed.

22. In a machine tool, the combination of a frame structure, a machine tool head assembly mounted to move on said frame structure, and comprising a saddle unit, a cradle on said saddle unit, an interchangeable tool unit adapted to occupy said cradle, means for driving the tool of said tool unit, and means for bodily feeding said tool head assembly on said frame structure.

23. In a machine tool, the combination of a frame structure, a machine tool head assembly mounted to move on said frame structure, and comprising a saddle unit, a cradle on said saddle unit, slideways on said saddle unit extending under said cradle, an interchangeable tool unit adapted to occupy said cradle, means for driving the tool of said tool unit, and means for bodily feeding said tool head assembly on said frame structure.

24. The combination of a machine tool frame having slideways and a self-contained unit movable along said slideways, of a combined driving and feeding motor, a rapid traverse motor and a tool spindle, all carried by said unit, means operated by said combined driving and feeding motor for driving said tool spindle and bodily feeding said unit along said slideways and means operated by said rapid traverse motor for changing the rate of said feed, comprising a revolving drum, a drive for said drum to revolve the same and adjustably mounted switch operating means on the drum for opening and closing a switch or switches in circuit with said motors.

25. The combination of a machine tool frame having slideways and a self-contained unit movable along said slideways, of a combined driving and feeding motor, a rapid traverse motor and a tool spindle, all carried by said unit, means operated by said combined driving and feeding motor for driving said tool spindle and bodily feeding said unit along said slideways and means operated by said rapid traverse motor for changing the rate of said feed, comprising a revolving drum set in motion by the operation of said rapid traverse motor and means on said drum for actuating a plurality of switches in circuit with said motors.

26. In a machine tool, the combination of a frame structure, a machine tool head mounted for translation on said frame structure, means for translating said head with a rapid traverse, a tool spindle carried by the head, a combined drive and feed motor for driving the tool spindle and feeding the head and means actuated by the rapid traverse translation of the head for controlling the operation of said combined drive and feed motor.

27. In a machine tool, the combination of a frame structure, a machine tool head mounted for translation on said frame structure, a tool spindle carried by said head, means carried wholly by the head for driving said spindle, means carried wholly by the head for translating the head and means carried wholly by the head and actuated by the translation of the head for controlling the drive for said spindle.

28. In a machine tool, the combination of a frame structure, a machine tool head mounted for translation on said frame structure, means carried wholly by the head for translating the head with a rapid traverse, a tool spindle carried by the head, a combined drive and feed motor carried by the head for driving the tool spindle and feeding the head and means carried wholly by the head and actuated by the rapid traverse translation of the head for controlling the operation of said combined drive and feed motor.

29. A machine tool head organization, comprising in combination, a saddle unit, an interchangeable tool unit carried by said saddle unit, a tool spindle carried by said tool unit, spindle feeding mechanism carried by said tool unit, and means for driving said spindle.

30. In a machine tool, the combination of a frame structure, a self-contained machine tool head assembly mounted to move bodily on said frame structure and comprising a saddle unit, a tool unit carried by said saddle unit, a tool spindle in said tool unit, means carried wholly by the head for driving said spindle, means carried wholly by the head for moving said head on said frame structure and means in said tool unit for feeding the tool spindle.

31. In a machine tool, the combination of a frame structure, a self-contained machine tool head assembly mounted to move bodily on said frame structure and comprising a saddle unit, an interchangeable tool unit carried by said saddle unit, tool driving mechanism in said saddle unit, tool driving mechanism contained in said tool unit, means for connecting the tool driving mechanisms of said units for extending the tool drive from the saddle unit into the tool unit and tool feeding mechanism in said tool unit.

Signed at Rockford, in the county of Winnebago, and State of Illinois, this 29th day of April, 1931.

ALEXANDER OBERHOFFKEN.